R. ROMAINE.
Steam Plow.
No. 12,447.
Patented Feb. 27, 1855.
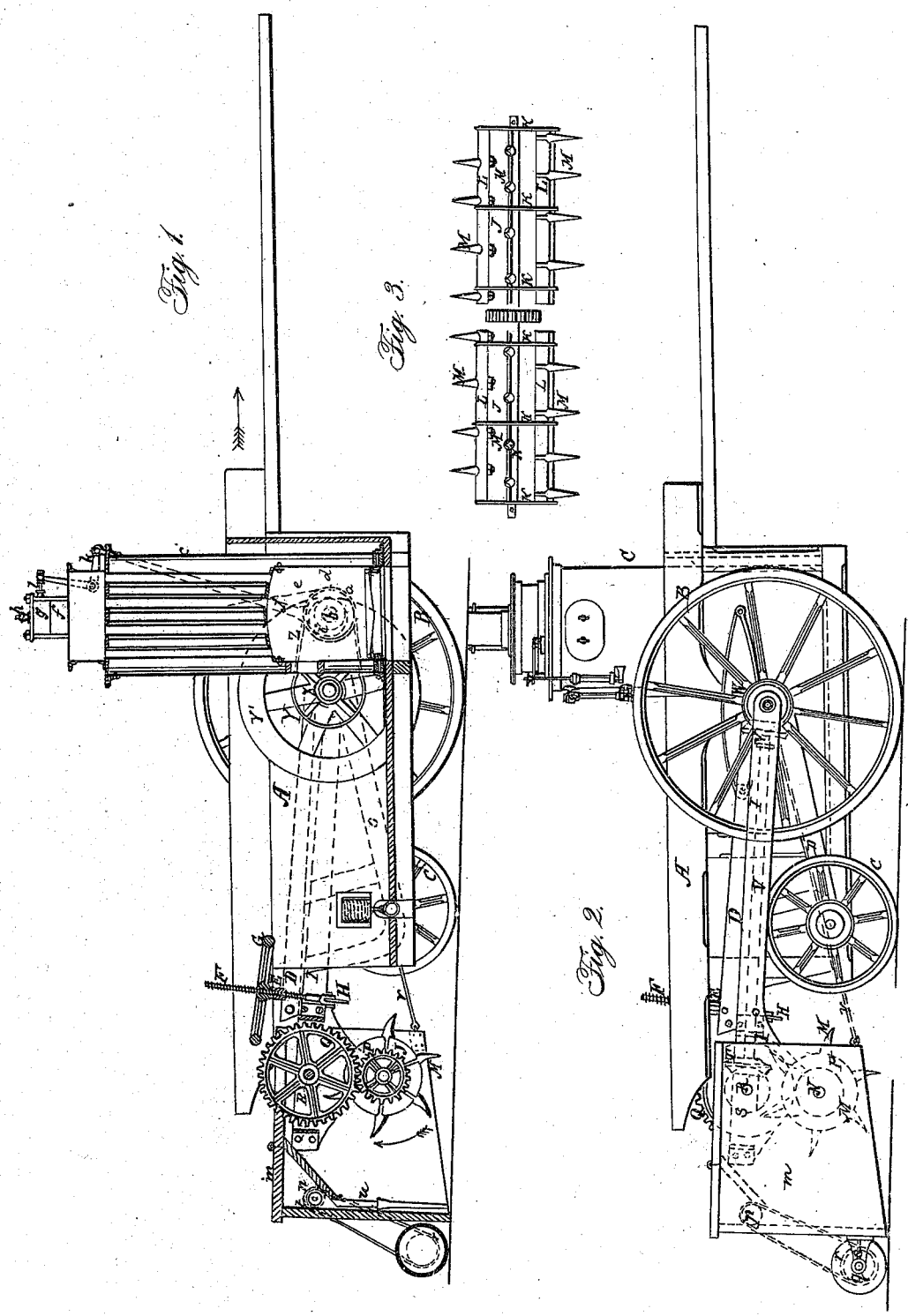

UNITED STATES PATENT OFFICE.

ROBERT ROMAINE, OF MONTREAL, LOWER CANADA, RESIDING AT KELVE-DON, ENGLAND.

IMPROVEMENT IN SEED-PLANTERS.

Specification forming part of Letters Patent No. 12,447, dated February 27, 1855.

*To all whom it may concern:*

Be it known that I, ROBERT ROMAINE, of Montreal, in the Province of Lower Canada, have invented certain Improvements in Agricultural Apparatus; and I do hereby declare that the following is a full and exact description thereof, reference being had to the accompanying drawings and the letters of reference marked thereon.

The nature of my invention consists in an agricultural apparatus whereby the operations which are now performed at various and distinct times may be all performed simultaneously.

It consists of a cylindrical-toothed drum which may be attached to a cart or other vehicle, and which as it revolves digs, pulverizes, or drills the soil, and at the same time may be attached to the seed-sowing box and leveler and the roller, so that the plowing or digging, seed-sewing, leveling and rolling may all be done simultaneously, if desired.

In the accompanying drawings, Figure 1 on Sheet 1 is a longitudinal vertical section of one modification of the improved mechanism with the digger, seed-sower, leveler and roller. Fig. 2, same sheet, is an external longitudinal elevation of the same. Fig. 3 is a longitudinal elevation of the digger or soil-loosener detached. These may be actuated by any suitable motive power.

In the arrangement shown by the drawings the apparatus is driven by a small steam engine placed in the cart A, supported on the pair of large running-wheels B, made with very wide tires or rims to prevent them from sinking too deeply into the soil, and upon a second or hind pair of smaller wheels, C, which run loose on the two extremities of a hollow or tubular axle set in the fixed framing D of the machine. This framing is supported at one end by the axle of the large wheels B, and is tied together by a tie-rod and transverse bar, E, at the opposite end. It is through the center of this bar that the raising and lowering screw F is passed, this screw having upon its upper end an adjusting hand-wheel, G. The lower end of this screw is connected to a transverse bar, H, connecting the two sides of the movable frame I, supported at one end by the main axle, fitting loosely thereon, the opposite end being suspended over the soil and carrying the soil breaking or digging cylinder or cylinders J. This roller consists of two or more disks, K K, through which pass the longitudinal bars L L. These bars carry the picks, forks, or knives M M, of any convenient form. These picks are bolted onto the bars L at suitable distances, as according to the nature of the ground to be operated upon. The disks K K of the cylinder J are secured to the tubular shaft N, through the center of which is passed a tie-rod, O, which is fitted at each extremity with shoulders inside and a nut outside the journals or bearings of the shaft N, caused by the framing I. A pair of brass bushes may be bolted to this framing to receive the journals of the digging-cylinders, the said framing being composed either of wood or of boiler-plate. A rapid rotary motion in the direction of the arrow is communicated to these cylinders through the pinion P, keyed onto the shaft N. This pinion gears with the spur-wheel Q on the shaft R, which may be made tubular for the sake of lightness. At S is a bevel-wheel, keyed onto the same shaft and gearing, with a similar wheel, T, on the tubular shaft U, (shown in red lines in Fig. 2,) and resting at one end in a suitable bearing in the movable frame I. The opposite end of this shaft carries another bevel-wheel, V, which gears with the corresponding wheel, W, on the first-motion shaft X.

In order to allow of the shaft U being moved with the framing I, it works at its inner end in a tubular bearing fitted loosely on the axis of the main pair of running-wheels B B.

The driving-shaft X is made tubular and revolves loosely on the axis of the large running-wheels, and a driving-pulley, Y, and fly-wheel Y' are keyed onto this shaft, which is driven by a pitch-chain, spur-wheel, or belt Z, forming round the smaller pulley *a*, which is carried by the fixed stud *b*, bolted to the side of the vertical tubular boiler *c*. To a stud-pin, *d*, in the pulley *a* is attached the lower end of the connecting-rod *e*, (shown by a single dotted red line in Fig. 1.) The opposite end of this rod is connected to the piston-rod of the vertical inverted steam-cylinder *f*, which is secured by bolts, or otherwise, to the side of the boiler.

The working portions of the machine are covered by the leveling-box $m$, which contains the seed-chamber $n$. This chamber contains a circumferentially-grooved cylinder or roller, $o$, which is made to revolve by a cord passing from an external pulley, $p$, on the axis of the cylinder to another pulley, $q$, on the shaft of the roller $r$. The light roller $r$ serves to carry the weight of the end of the leveling-box $m$ as it passes over the pulverized soil, the opposite side of the said box being attached loosely to the platform or framing D, thereby allowing the roller $r$ to raise or lower the leveling-box $m$ according to the inequalities of the soil, and also, when weighted, to press down the soil. It is carried by the small brackets $s$ $s$, which are bolted to the box $m$. A pair of brushes, $t$ $t$, are fitted inside the seed-chamber and press slightly against each side of the grooved cylinder. By this means the seeds are prevented from escaping excepting by the circumferential grooves in the cylinder. Each groove corresponds with a separate seed-duct, $u$, which deposits the seeds in the ground.

The machine is drawn by horse-power in the direction of the arrow by suitable shafts, and the earth is thrown up into a heap inside the leveling-box, which is tied by a cord and spring, $v$, to the axis of the large running-wheels to prevent it from being displaced by the pressure of the earth inside.

It will be obvious that by a very slight modification in the mechanism and the addition of another engine the large pair of running-wheels B B may be driven by the steam engine itself, thus making the implement a locomotive machine. This may be accomplished by keeping a driving-pulley onto the main axle and driving it by a belt, similar to the mode shown of driving the hollow shaft X.

Having now described the nature of my invention and the manner in which the same may be used, I would state that I do not confine myself to the precise details described, as many variations may be made therefrom without deviating from the principle of my invention, and the digger might be used without the seed-sower and roller, or vice versa.

I am aware that a seeding apparatus has been arranged to follow a toothed cylinder, and also to precede either a toothed cylinder or roller. Therefore I do not claim either of these devices separately; but

What I claim as my invention, and desire to secure by Letters Patent, is—

The rotary toothed cylinder (or digger) followed immediately by the seed-sower and roller, as described.

In witness whereof I, the said ROBERT ROMAINE, have hereunto set my hand and seal the 8th day of December, 1853.

ROBT. ROMAINE. [L. S.]

In presence of—
  J. HENRY JOHNSON,
    47 *Lincoln's Inn Fields, London, Solr.*
  BRISTOW HUNT,
    *His Clerk.*